US009528848B2

(12) United States Patent
Nakagawa

(10) Patent No.: US 9,528,848 B2
(45) Date of Patent: Dec. 27, 2016

(54) METHOD OF DISPLAYING POINT ON NAVIGATION MAP

(71) Applicant: Alpine Electronics, Inc., Tokyo (JP)

(72) Inventor: Atsushi Nakagawa, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/673,537

(22) Filed: Mar. 30, 2015

(65) Prior Publication Data

US 2016/0290820 A1    Oct. 6, 2016

(51) Int. Cl.
*G01C 21/36* (2006.01)
*G06F 17/24* (2006.01)
*G06F 3/0481* (2013.01)

(52) U.S. Cl.
CPC ......... *G01C 21/367* (2013.01); *G01C 21/3605* (2013.01); *G01C 21/3673* (2013.01); *G01C 21/3697* (2013.01); *G06F 3/04817* (2013.01); *G06F 17/241* (2013.01)

(58) Field of Classification Search
CPC .............. G01C 21/367; G01C 21/3605; G01C 21/3673; G01C 21/3697; G06F 3/04817; G06F 17/241
USPC ......................................... 701/532
See application file for complete search history.

(56) References Cited

U.S. PATENT DOCUMENTS 7,834,778 B2 * 11/2010 Browne ................ G08G 1/143
340/932.2
8,498,808 B2 * 7/2013 Vavrus ................... G01C 21/20
701/408
8,983,778 B2 * 3/2015 McCarthy ............ G06T 15/005
701/400
9,146,125 B2 * 9/2015 Vulcano ............... G08G 1/0969
2005/0251331 A1 * 11/2005 Kreft ..................... G01C 3/08
701/438
2005/0288859 A1 * 12/2005 Golding ............. G01C 21/3602
701/438
2007/0185649 A1 * 8/2007 Geilich .................. G01C 21/32
701/532
2010/0161720 A1 * 6/2010 Colligan ............... G06Q 30/02
709/203
2010/0168996 A1 * 7/2010 Bourque ............ G01C 21/3611
701/532
2010/0222996 A1 * 9/2010 Weiland ................. G01C 21/20
701/532

(Continued)

FOREIGN PATENT DOCUMENTS

JP         2004-245581         9/2004
WO     WO 2006/075606         7/2006

*Primary Examiner* — Atul Trivedi
(74) *Attorney, Agent, or Firm* — Muramatsu & Associates

(57) ABSTRACT

A method and an apparatus of displaying a point on a map of route guidance includes receiving an entry of a user, determining a point based on the entry of the user, determining an address number of the point, retrieving map data indicating a road segment which includes the address number of the point from map information storage, estimating a position of the location based on the street address number of the point and position data of the road segment, and displaying the point with an icon at the estimated position on the map. While estimating the position of the point, a side of the street at which the point is located is estimated and a shape of the icon graphically indicates a direction corresponding to the side of the street at the estimated position.

20 Claims, 17 Drawing Sheets

(56) References Cited

U.S. PATENT DOCUMENTS

| | | | |
|---|---|---|---|
| 2010/0250109 A1* | 9/2010 | Johnston | G06Q 30/0261 |
| | | | 701/532 |
| 2010/0332299 A1* | 12/2010 | Herbst | G01C 21/3638 |
| | | | 705/14.4 |
| 2011/0160995 A1* | 6/2011 | Geilich | G01C 21/32 |
| | | | 701/532 |
| 2011/0224898 A1* | 9/2011 | Scofield | G01C 21/3492 |
| | | | 701/532 |
| 2013/0325342 A1* | 12/2013 | Pylappan | G10L 21/00 |
| | | | 701/533 |
| 2014/0278071 A1* | 9/2014 | San Filippo | G01C 21/3492 |
| | | | 701/465 |
| 2014/0280180 A1* | 9/2014 | Edecker | G06F 17/30598 |
| | | | 707/740 |
| 2016/0003637 A1* | 1/2016 | Andersen | G01C 21/3617 |
| | | | 701/519 |
| 2016/0102992 A1* | 4/2016 | Otero Diaz | G01C 21/3647 |
| | | | 701/532 |
| 2016/0109256 A1* | 4/2016 | Kumon | G01C 21/3664 |
| | | | 701/532 |

* cited by examiner

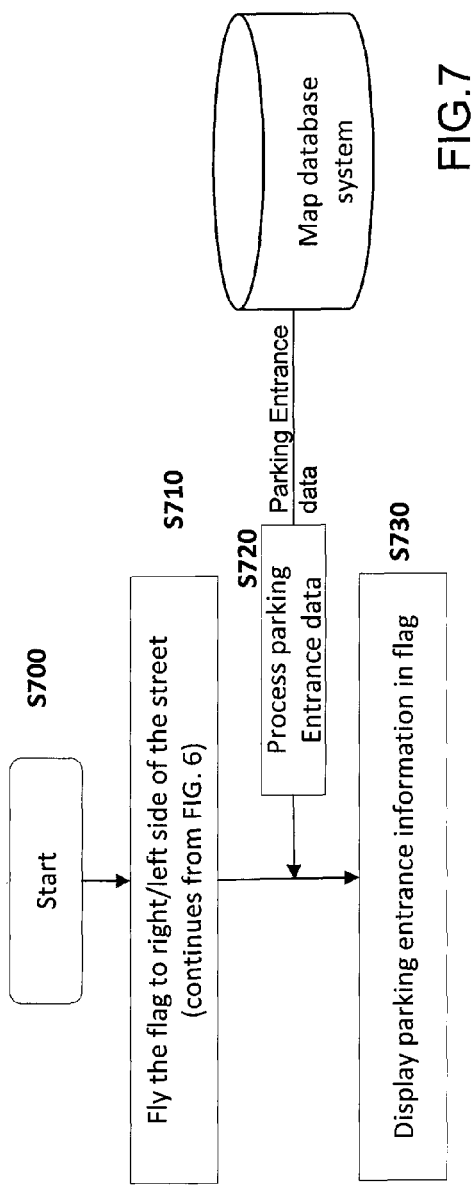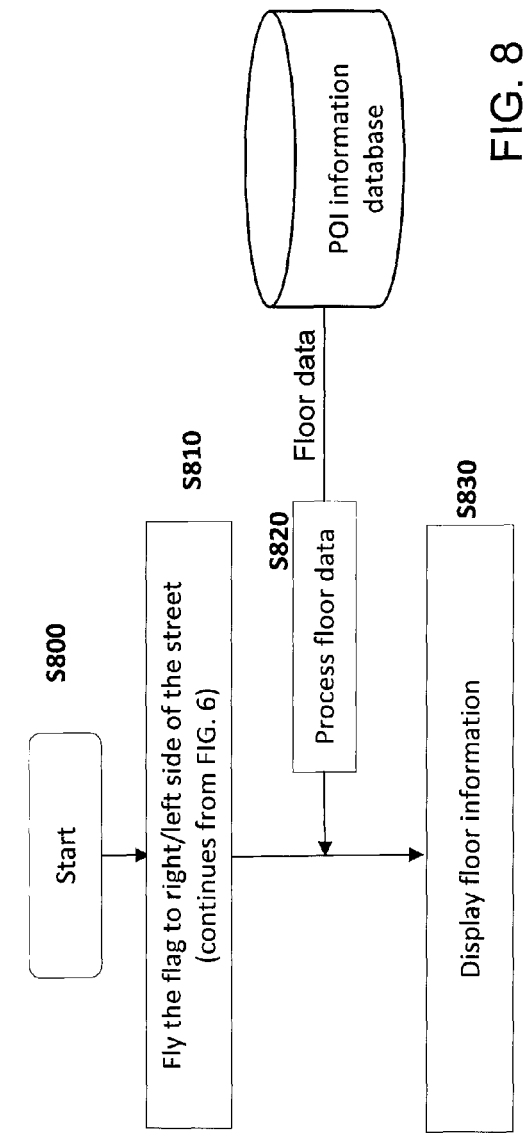

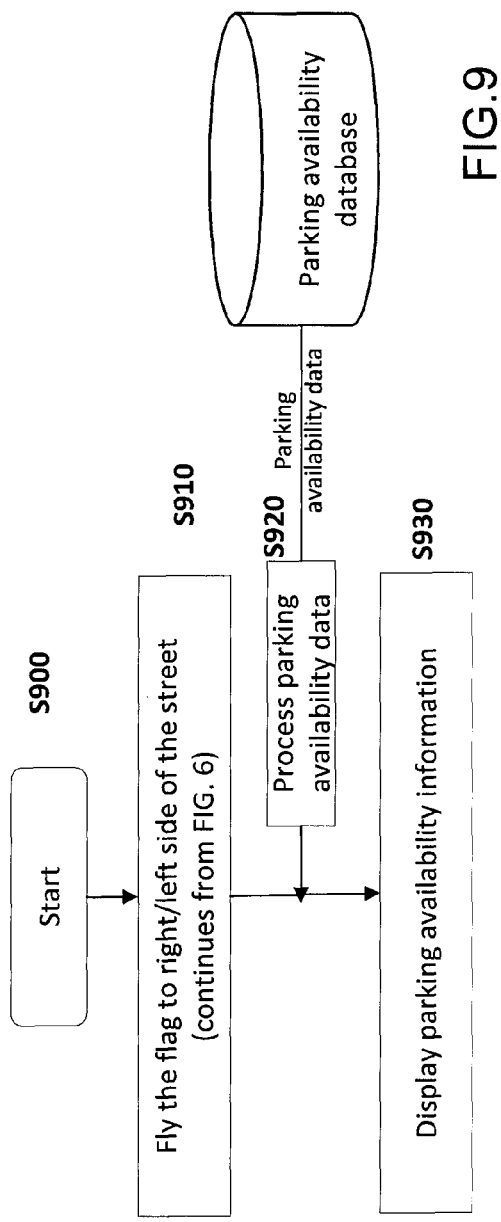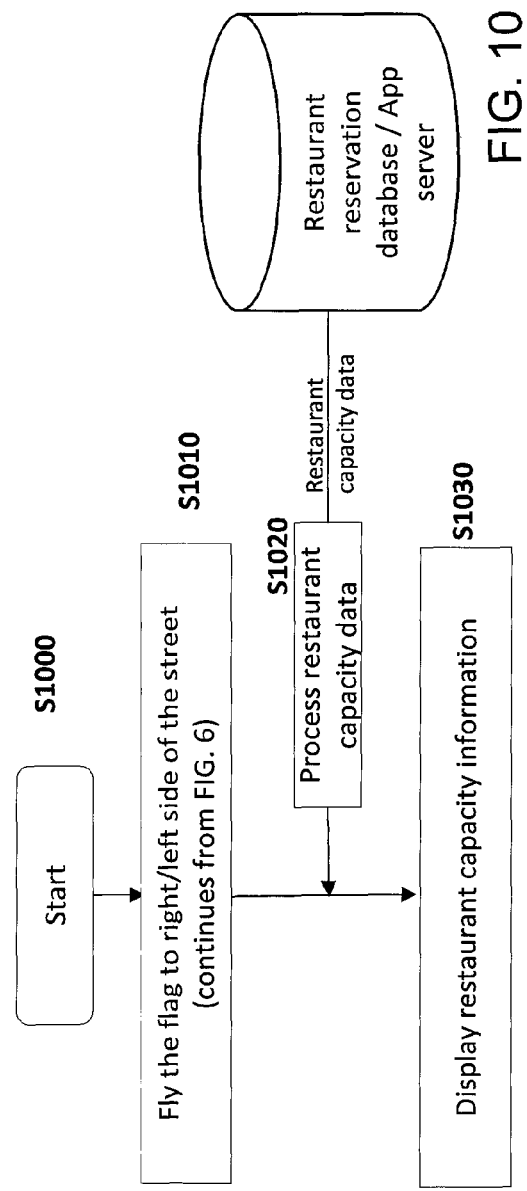

METHOD OF DISPLAYING POINT ON NAVIGATION MAP

BACKGROUND

1. Field

The present disclosure relates to a method of displaying a point on a navigation map with additional information. More specifically, embodiments in the present disclosure relate to a method of displaying a point on a navigation map with additional information, which enables a driver to distinctively and visually understand an exact location of the point with the additional information.

2. Description of the Related Art

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the current position, and reads out map data pertaining to an area at the current position either from a local data storage medium such as a digital versatile disc (DVD), a hard disk drive (HDD) or a solid-state drive (SSD), or from a remote server via internet. Typically, the navigation system displays a map image on a monitor screen while superimposing thereon graphical marks representing a current location of the user and a destination. In addition, as other geographical information, such as Point of Interests (POIs) by category, or traffic information signs indicating traffic conditions such as traffic incidents, traffic congestions, road or lane closures, detours, criminal situations, natural disasters, may be superimposed on the map image on the monitor.

A situation may arise where a user wants to search a point, either a final destination or a waypoint, and wishes to decide the point based on which side of a road the destination is. In addition, another situation may arise where a certain condition related to the point, such as additional information related to the point may affect driving and maneuver to the point. While the vehicle navigation system is showing a map on the monitor screen, it is not easy to add extra information related to the point in a manner that the information is understood intuitively by the user while driving, because the map tends to be crowded by other map information, such as streets, etc., and understanding the extra information of the point on the map may require additional cognitive load and thus may become driving distraction while driving load is relatively high.

Accordingly, there is a need of a method of displaying a point on a navigation map with additional information. More specifically, there remains a need for a new and improved method of displaying the point on a navigation map with additional information, which enables a driver to distinctively and visually understand an exact location of the point with additional information which assists the driver to execute appropriate driving actions and maneuvers according to the exact location of the point while driving and to be kept updated regarding the additional information of the selected point according to the progress on the route to the point.

SUMMARY

In one aspect, a method of displaying a point on a map of route guidance is provided. This method includes receiving an entry of a user, determining a point based on the entry of the user, determining an address number of the point, retrieving map data indicating a road segment which includes the address number of the point from map information storage, estimating a position of the location based on the street address number of the point and position data of the road segment, and displaying the point with an icon at the estimated position on the map. Here, estimating the position of the point includes estimating a side of the street at which the point is located, where a shape of the icon graphically indicates a direction corresponding to the side of the street at the estimated position.

In another aspect, a navigation system is provided. The navigation system includes one or more input device which receives an entry of a user; a processor which determines the point based on the entry of the user and determines an address number of the point, to retrieve map data indicating a road segment which includes the address number of the point, and estimates a position of the location based on the street address number of the point and position data of the road segment, and a screen which displays the point with an icon at the estimated position on a map of route guidance. The processor further estimates a side of the street at which the point is located while estimating the position of the point, where a shape of the icon graphically indicates a direction corresponding to the side of the street at the estimated position.

In one embodiment, building area map information of the point from the map information storage is obtained and one or more positions of one or more entrances to the area of the building are estimated from the building area map information of the point, and one or more sub icons representing the one or more entrances indicative of the estimated one or more positions are displayed in the icon.

In one embodiment, at least one of building and floor information of the point is received from a point of interest information database, and at least one of building and floor information of the point is displayed in the icon.

In one embodiment, one or more street views of the point are obtained from the map information storage, if available, and the one or more street views of the point are displayed in the icon.

In one embodiment, one or more ratings of the point are obtained from one or more network systems, if available, and the one or more ratings of the point on the one or more network systems are displayed in the icon.

In one embodiment, one or more statuses of availability of one or more facilities at the point are obtained via internet, and the one or more statuses of availability are displayed in the icon.

In one embodiment, the one or more statuses of availability are displayed in the icon by graphically changing a whole or portion of the icon by one of a size, a shape and a color.

In one embodiment, one or more facilities is a parking facility and the status of availability of the parking facility is indicative of remaining capacity by a number of vehicles obtained from a parking availability database on the internet. In another embodiment, the one or more facilities are businesses and the one or more statuses of availability of the businesses are indicative of reservation availability for time frames of the near future obtained from a service reservation server on the internet. In another embodiment, the one or more facilities are businesses and the one or more statuses of availability are indicative of business hour statuses of the businesses in the near future, obtained from a point of interest information database on the internet.

BRIEF DESCRIPTION OF THE DRAWINGS

FIGS. 7, 8, 9 and 10 are flow charts of obtaining additional information of the point and displaying the additional information according to various embodiments.

DETAILED DESCRIPTION OF THE PREFERRED EMBODIMENTS

Various embodiments for the method of displaying a point on a navigation map with additional information will be described hereinafter with reference to the accompanying drawings. Unless defined otherwise, all technical and scientific terms used herein have the same meaning as commonly understood to one of ordinary skill in the art to which present disclosure belongs. Although the description will be made mainly for the case where the method of displaying the point with additional information on a navigation map of a navigation system installed on a vehicle, any methods, devices and materials similar or equivalent to those described, can be used in the practice or testing of the embodiments. All publications mentioned are incorporated by reference for the purpose of describing and disclosing, for example, the designs and methodologies that are described in the publications which might be used in connection with the presently described embodiments. The publications listed or discussed above, below and throughout the text are provided solely for their disclosure prior to the filing date of the present disclosure. Nothing herein is to be construed as an admission that the inventors are not entitled to antedate such disclosure by virtue of prior publications.

In general, various embodiments of the present disclosure are related to a method of displaying a point on a navigation map with additional information. Furthermore, the embodiments are related to a method of displaying additional information of the point in a visually distinctive manner using an icon indicative of a direction corresponding to a side of a street provided to the point. Thus, a user can easily distinctively and visually understand exact locations of the point with additional information on the navigational map.

Figure 1:
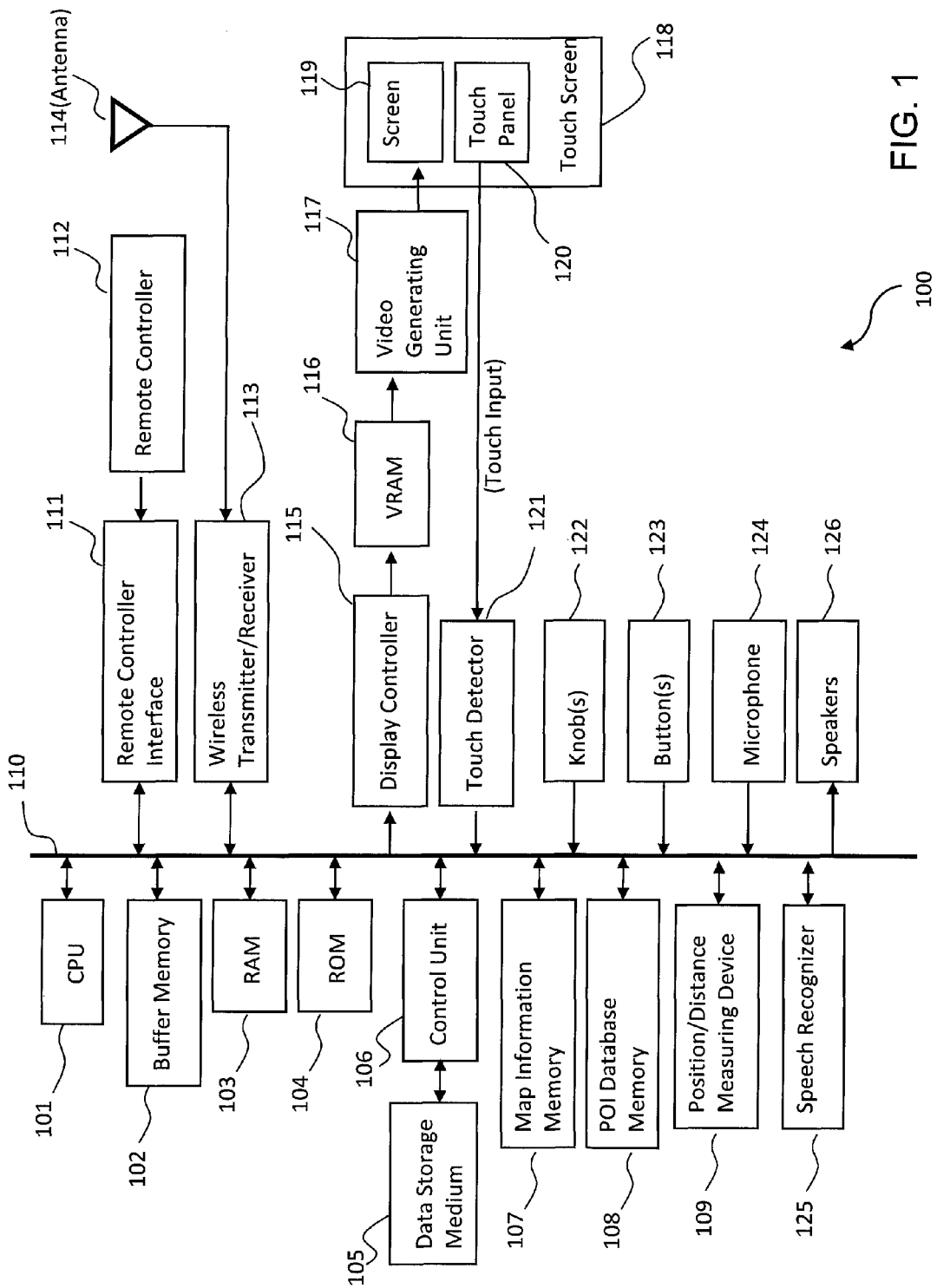
FIG. 1 is a block diagram of a navigation system according to one embodiment.

FIG. 1 is a block diagram of a vehicle navigation system that executes a method of displaying a point on a navigation map with additional information according to one embodiment. Note that the block diagram in FIG. 1 is merely an example according to one embodiment for an illustration purpose and not intended to represent any one particular architectural arrangement. The various embodiments can be applied to other types of navigation system implemented by portable navigation systems, personal digital assistants, cellular phones, smart phones, portable computers, sets of client computers and server computers in a network. For example, the vehicle navigation system 100 includes a central processor unit (CPU) 101 for controlling an overall operation of the navigation system, a buffer memory 102 for temporally storing data such as an icon data table for efficient displaying icons in accordance with this disclosure, a random access memory (RAM) 103 for storing a processing result such as guide route, and a read only memory (ROM) 104 for storing various control programs, such as a route search program and a map matching program necessary for navigation control as well as icon displaying program of this disclosure.

The vehicle navigation system 100 also includes a data storage medium 105 such as a hard disk in a hard disk drive (HDD), a flash memory in a solid state drive (SSD) or USB key memory, a compact disc-read only memory (CD-ROM), a digital versatile disc (DVD) or other storage medium for storing the map data. The vehicle navigation system 100 also includes a control unit 106 for controlling an operation for reading the information from the data storage medium 105. The vehicle navigation system 100 also includes a position/distance measuring device 109 for measuring a present vehicle position or user position. For example, the position measuring device 109 has a vehicle speed sensor for detecting a moving distance, a gyroscope for detecting a moving direction, a microprocessor for calculating a position, a global positioning system (GPS) for receiving and analyzing GPS signals, etc., and each connected by a bus system 110.

The vehicle navigation system 100 further includes a map information memory 107 for storing a portion of the map data relevant to ongoing operations of the vehicle navigation system 100 which is read from the data storage medium 105, a point of interest (POI) database memory 108 for storing database information such as POI information which is read out from the data storage medium 105.

The vehicle navigation system 100 accommodates a plurality of means for receiving user inputs. For example, the navigation system 100 may include a remote controller 112 externally for executing menu selection operations, cursor movements, zoom in/out operations, destination entry operations etc., and a remote controller interface 111, in the navigation system 100 and coupled to other devices via a bus system 110, handles reception of signals from the remote controller 112. Although a remote controller is one example for selecting menus, executing selected functions etc., the navigation system includes various other input methods, to achieve the same and similar operations done through the remote controller. For example, the navigation system 100 may include a touch detector 121 for detecting a touch or press input of a user on a touch panel 120 of a touch screen 118, which allows the user to enter intuitive look and feel input. Alternatively, as seen in a traditional vehicle entertainment system, knobs 122 and buttons 123 may be included in the navigation system 100. To accommodate hands-free input operation to avoid driver distraction, it may be appropriate to use voice commands as user inputs for the navigation system 100. To accommodate such voice commands, microphone 124 for receiving speech input may be included. Once a voice command is received at the microphone 124, the voice command is sent to a speech recognizer 125 to be matched with any speech pattern associated with navigation related vocabulary in a speech database and the matched speech pattern is interpreted as a voice command input from the user.

The vehicle navigation system 100 may also include a plurality of means to output an interactive result of user input operations, including a map and point of interests (POIs). For example, the navigation system 100 may include a display controller 115 for generating map images, such as map guide images, arrow guide images, icon images of POIs, as well as menu related images related to the map information and the generated map image is stored in a video RAM (VRAM) 116. The map image stored in the VRAM 116 is sent to a video generating unit 117 where the map image is converted to an appropriate format to be displayed on a screen 119 of a touch screen 118. Upon receipt of video data, the screen 119 displays the map. Alternatively, to keep eyes of a driving user on a road rather than prompting the driving user to look into the screen, the interactive output may be presented to the driving user as audio feedback via one or more speakers 126.

Furthermore, the navigation system 100 may include a wireless transmitter/receiver 113. Using the wireless transmitter/receiver 113 via antenna 114, the navigation system 100 may communicate with external devices inside the vehicle, external devices surrounding vehicles, remote servers and networks, etc. For example, the wireless transmitter/receiver 113 may be used for retrieving map and traffic information from a remote server that updates map and traffic data frequently and periodically.

The bus system 110 may include one or more busses connected to each other through various adapters, controllers, connectors, etc. and the devices and units mentioned above are coupled to each other via the bus system.

The CPU 101 controls an overall operation of the navigation system including displaying a point on a navigation map with additional information according to one embodiment. For example, the data related to the point on the navigation map with the additional information will be stored in the buffer memory 102 for further processing. As noted above, the navigation system 100 conducts the process of displaying a point on a map of a navigation system.

Figure 2A:
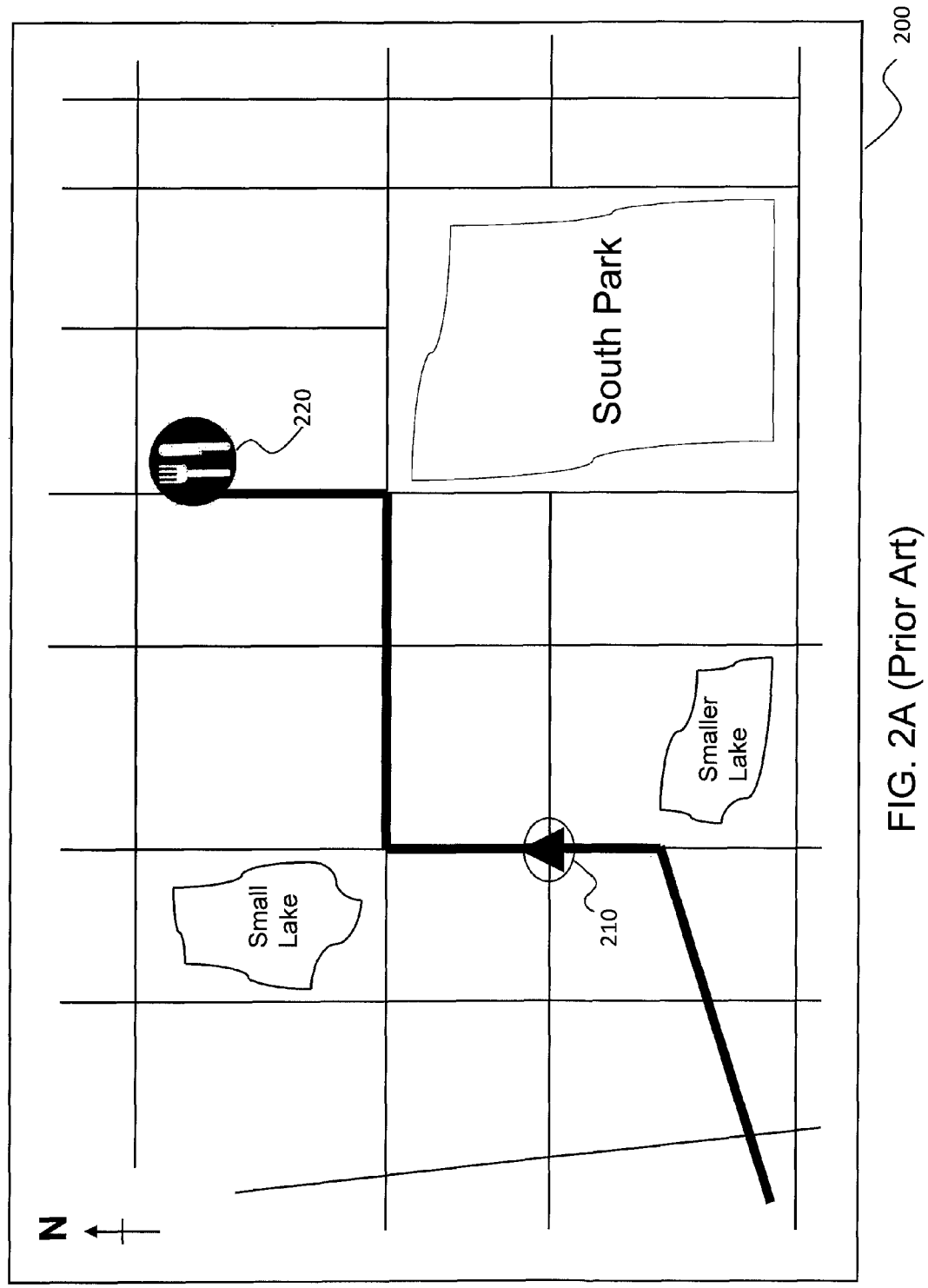
FIG. 2A shows a screen example of displaying a point.

When a driver enters a point on the navigation system 100, based on either an earlier search result or a direct entry of a location by address, intersection, etc., the navigation system 100 determines the point based on the entry of the driver. For example, if the driver searches a point of interest (POI), the navigation system searches one or more POIs based on additional location such as in a particular city, around a current vehicle position, etc., and the point is obtained after the driver selects one POI among the one or more POIs based on information obtained from POI database memory. Alternatively, the driver may enter an address of the point itself. Alternatively, the driver may plot a pin on a navigation map in order to spot the location of the point. The driver may also enter streets names in order to define an intersection for plotting the point. Once the point is determined, an address number of the point can be also determined and the navigation system 100 retrieves map data indicating a road segment which includes the address number of the point from map information storage. In order to display an icon for indicating the point, the navigation system 100 estimates a position of the location based on the street address number of the point and position data of the road segment, including estimating a side of the street at which the point is located. Once the estimation is completed, the navigation system 100 displays the point with a point icon 220 at the estimated position on the map with regards to a vehicle position icon 210 indicative of a current position of the vehicle, together with a route, on a navigation map 200 as shown in FIG. 2A. Here, the point icon 220 is located on the right side of a street from a driving direction. Even though the point icon 220 is located on the right side, it may be unclear to a driver, especially when the navigation map 200 including the point icon 220 and the vehicle position icon 210 is already filled with any other navigational information while the driver is overloaded with other cognitive tasks essential for driving and is unable to immediately understand which side of the street the point icon 220 is located.

Figure 2B:
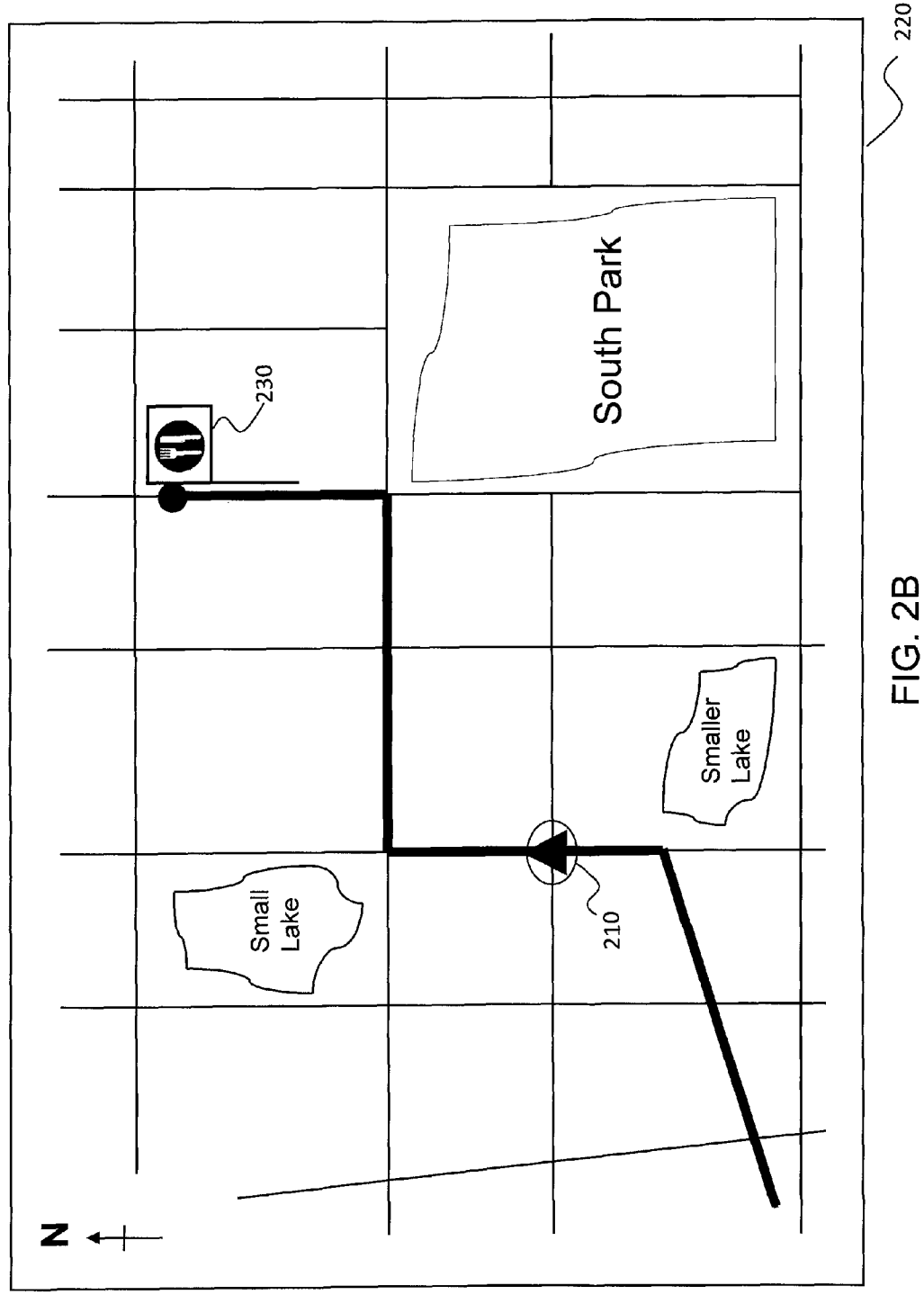
FIGS. 2B and 2C show displayed screen examples of a map including a point icon according to one embodiment.
Figure 2C:
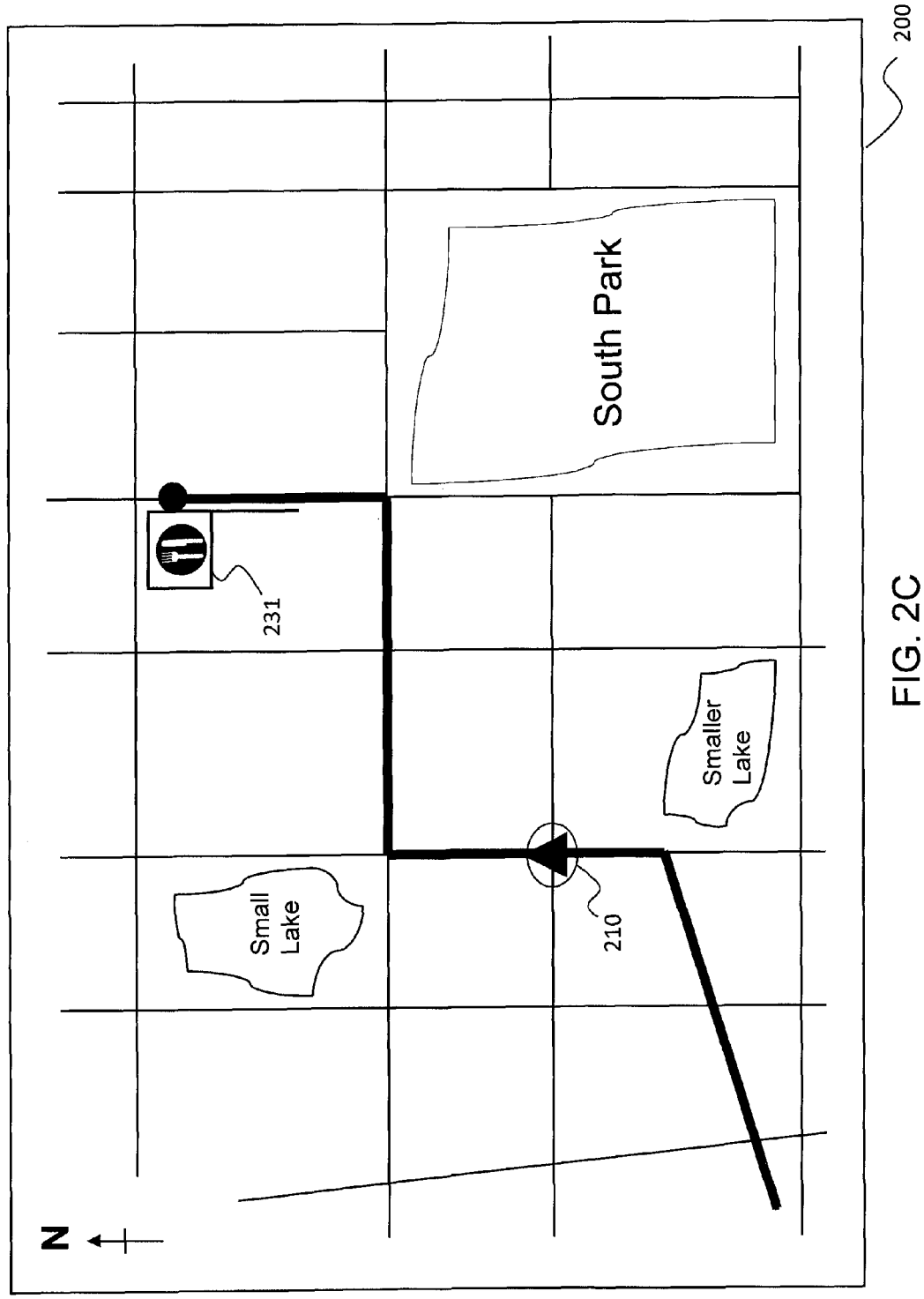

In one embodiment, in order to address the difficulty stated above, a point icon 230 has an icon shape which graphically indicates a direction corresponding to the estimated side of the street the point is located, as illustrated in FIG. 2B. For example, the point icon 230 in FIG. 2B has a shape of a flag flying to the right side relative to a pole indicating that the location of the point is on the right side of the street. On the other hand, as shown in FIG. 2C, a point icon 231 has a shape of a flag flying to the left side indicating that the location of the point is on the left side of the street. By using an icon shape which is able to indicate the direction of the location with regards to the street in an enlarged manner, it assists a driver to understand the actual location of the point easily and clearly, thus the driver can determine maneuvers to make in order to reach the point without confusion.

Figure 3A:
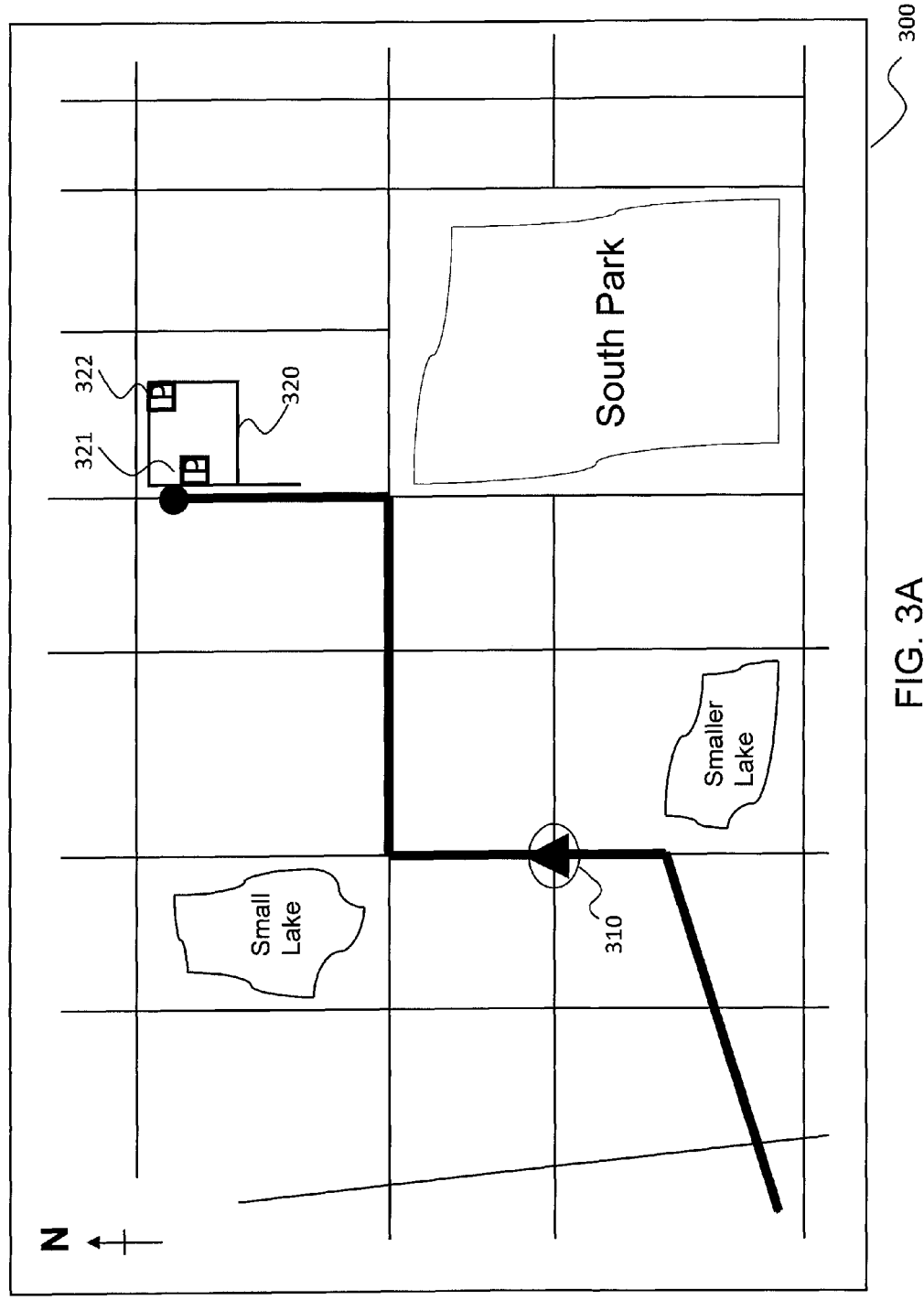
FIGS. 3A, 3B, 3C, 3D, 3E, 3F and 3G show displayed screen examples of the point icon with additional information according to various embodiments.

In another embodiment, it is possible to provide additional information which may affect the driver's decision of maneuvers to make in order to reach the point. In FIG. 3A, a navigation map 300 includes an icon 310 indicative of current vehicle position and a point icon 320. The point icon 320 has a shape which graphically indicates a direction corresponding to the estimated side of the street the point is located and additionally includes sub icons 321 and 322 indicating one or more positions of parking lots. In order to display these sub icons 321 and 322, the navigation system obtains building area map information of the point from the map information storage and estimates positions of one or more entrances to the area of the building from the building area map information of the point. Based on the estimated positions, a navigation system may determine positions of the sub icons 321 and 322 in the point icon 320 and display the point icon 320 and the sub icons 321 and 322 together on the navigation map 300. If the point is a large shopping mall or a shop which has a plurality of entrances or parking structures, these sub-icons showing more accurate locations of the entrances or parking lots are helpful for the driver to further determine possible maneuvers to make in order to reach an entrance or parking lot of the point as the driver intends without wasting time by overlooking the intended entrances or parking lots.

Figure 3B:
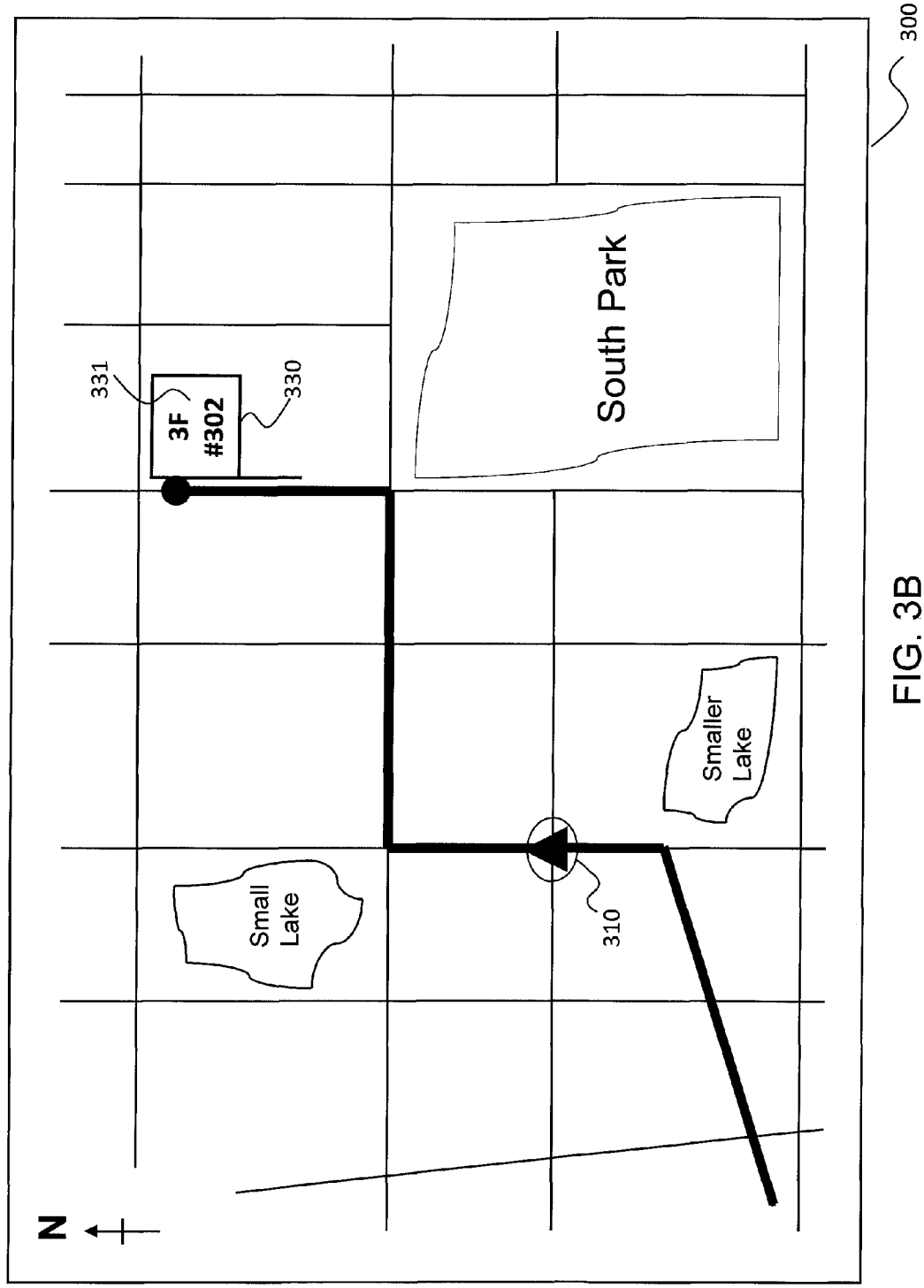

In another embodiment, it is possible to provide additional information which may be needed after driving in order to assist the driver and possibly passenger reaching the point. In FIG. 3B, a navigation map 300 includes an icon 310 indicative of current vehicle position and a point icon 330. The point icon 330 has a shape which graphically indicates a direction corresponding to the estimated side of the street the point is located and additionally includes a sub address 331 indicating a floor such as "3F" and suite number such as "#302" of the point. The sub address may not be limited to the floor or suite number. Any information related to a location of the point within a facility, such as the building and floor, including a building label (e.g. A, B, C, . . . ) and a floor number (e.g. B2, B1, G, 1, 2, etc.) of a complex that includes the point may be indicated in the point icon 330 in order to assist the driver or passenger to reach the point without difficulty. In order to display this sub address 331, the navigation system receives at least one of building and floor information of the point from a point of interest information database. Based on the received sub address 331, the navigation system may display the point icon 330 including the sub address 331 on the navigation map 300. If the point is a facility or a large shopping mall in which there are so many places and it is difficult to reach the point without the sub address, this sub address showing more accurate locations of the point in the facility or the large shopping mall is likely to be helpful for the driver to further reach the point without wasting time.

Figure 3C:
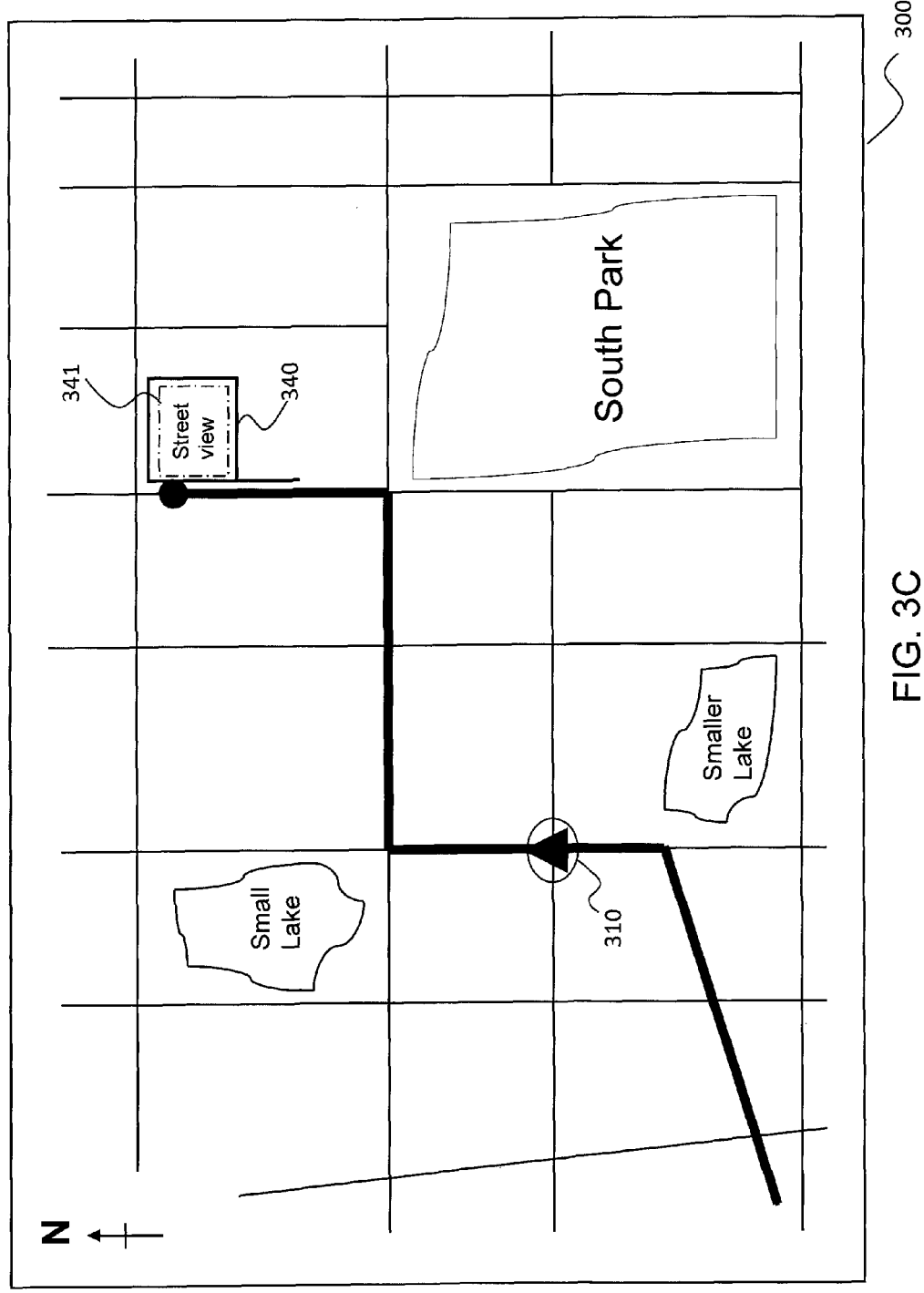

In another embodiment, it is possible to provide one or more street views of the point in order to assist the driver reaching the point. In FIG. 3C, a navigation map 300 includes an icon 310 indicative of current vehicle position and a point icon 340. The point icon 340 has a shape which graphically indicates a direction corresponding to the estimated side of the street the point is located and additionally includes one or more street views 341 in order to assist the driver to reach the point without difficulty. Here, an example of the street view is a panoramic view from the point on the street. In order to display the one or more street views 341, the navigation system obtains one or more street views of the point from map information storage, if available. Based on the obtained one or more street views 341, the navigation system may display the point icon 340 having the one or more street views 341 on the navigation map 300. If the point does not have any sign indicating a house number or a name of the point explicitly, it is hard to find the point. Thus, displaying the one or more street views of the point is likely to be helpful for the driver to further reach the point without wasting time.

Figure 3D:
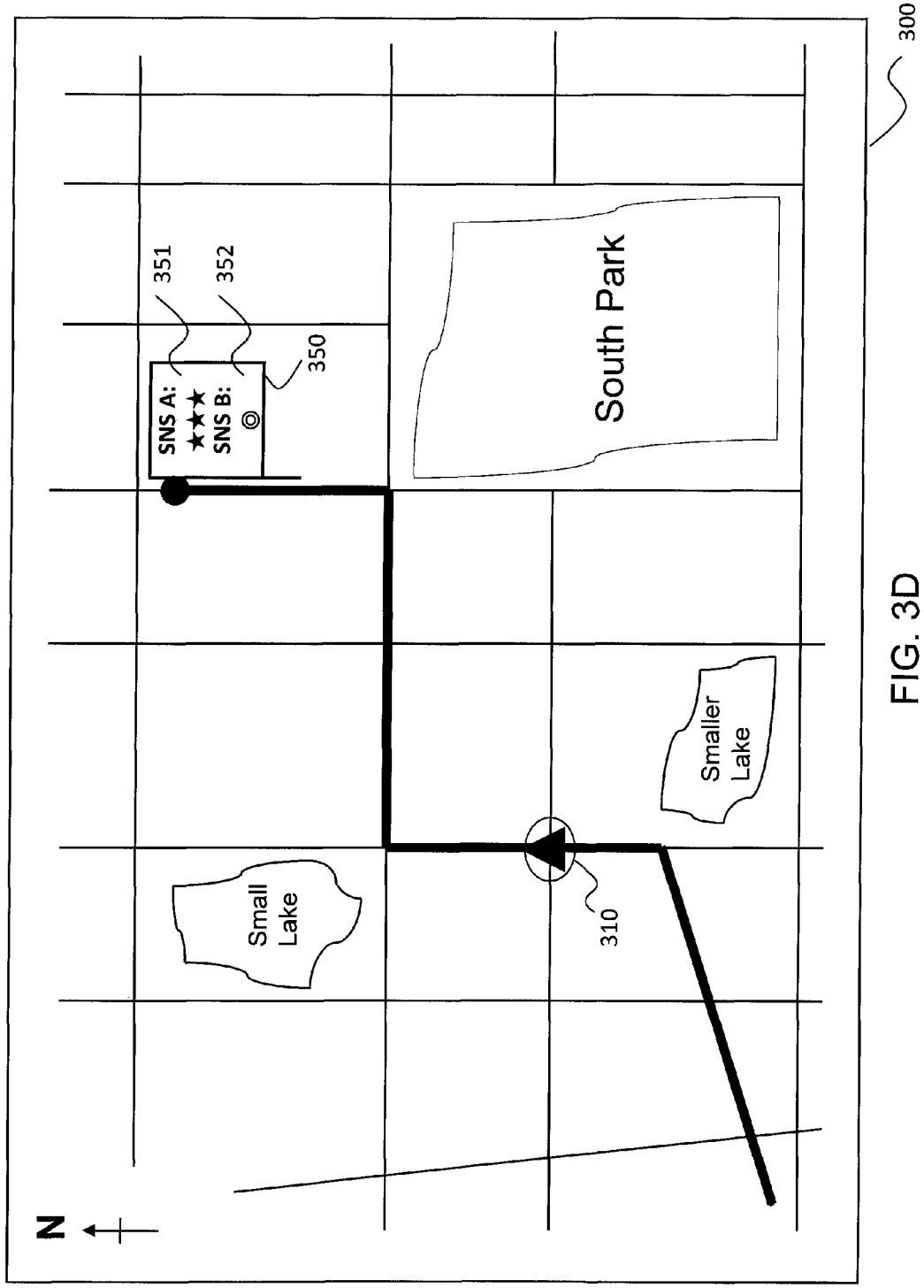

In another embodiment, it is possible to provide additional information such as ratings of the point available from the internet, including social network systems (SNSs) or any proprietary rating systems, which help the driver to decide or change her/his mind going to the point after seeing the ratings. In FIG. 3D, a navigation map 300 includes an icon 310 indicative of current vehicle position and a point icon 350. The point icon 350 has a shape which graphically indicates a direction corresponding to the estimated side of the street the point is located and additionally includes ratings 351 and 352 of the point available from SNS A and SNS B, respectively. Any rating information related to the point such as a number of stars given, or rating labels (e.g. A, B, C, . . . ) may be indicated in the point icon 350 in order to assist the driver or passenger to determine whether the point is the intended place for the driver or passenger to go. In order to display these ratings 351 and 352 from SNS A and SNS B, respectively, the navigation system receives one or more ratings of the point from one or more network systems, if available. Based on the received ratings 351 and 352, the navigation system may display the ratings 351 and 352 of the point available from the one or more network systems in the point icon 350 on the navigation map 300. This type of rating information display method together with the direction of the side of the street can be helpful for the driver to select a point of interest, if a plurality of points of interest is displayed as search candidates on the navigation map 300.

Figure 3E:
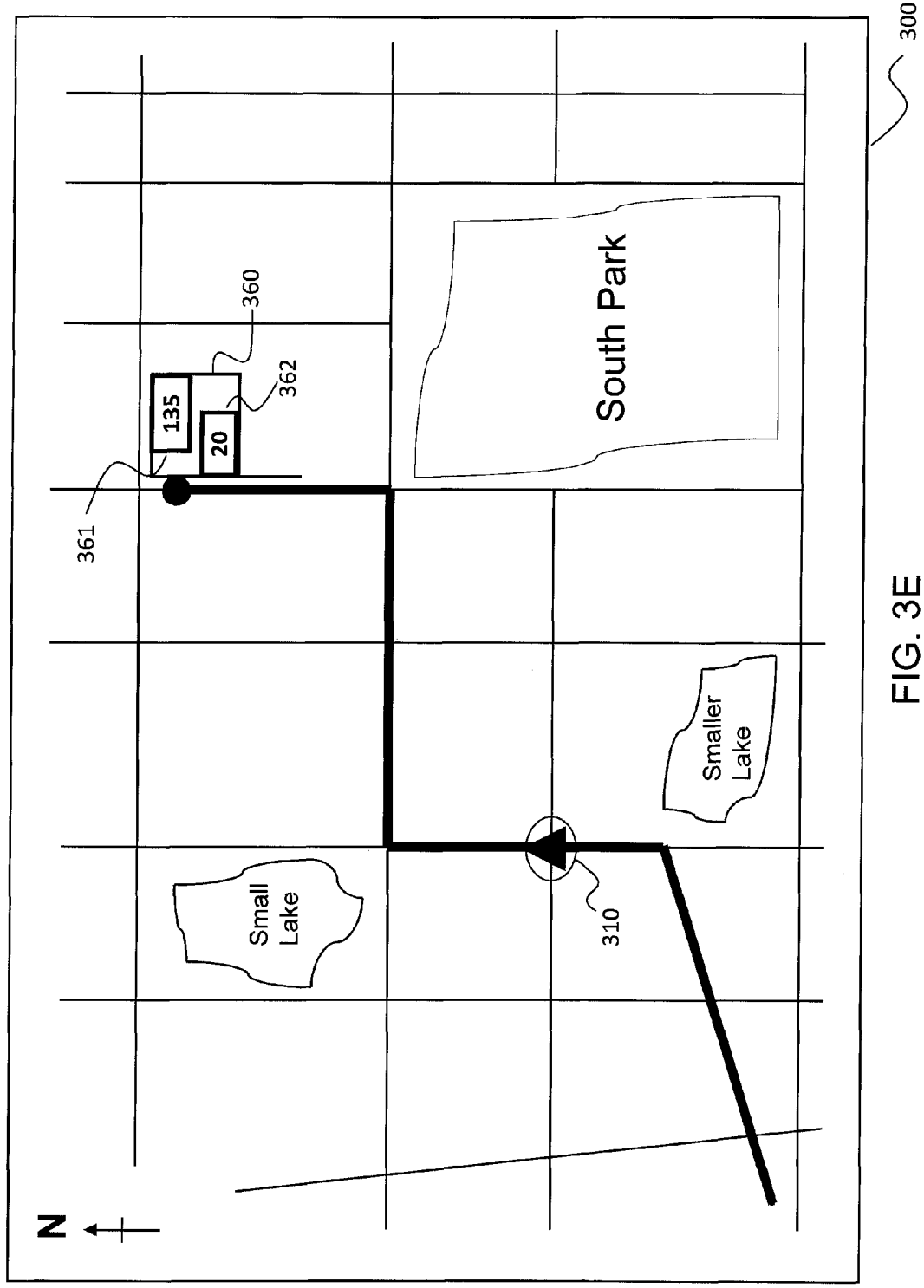
Figure 3F:
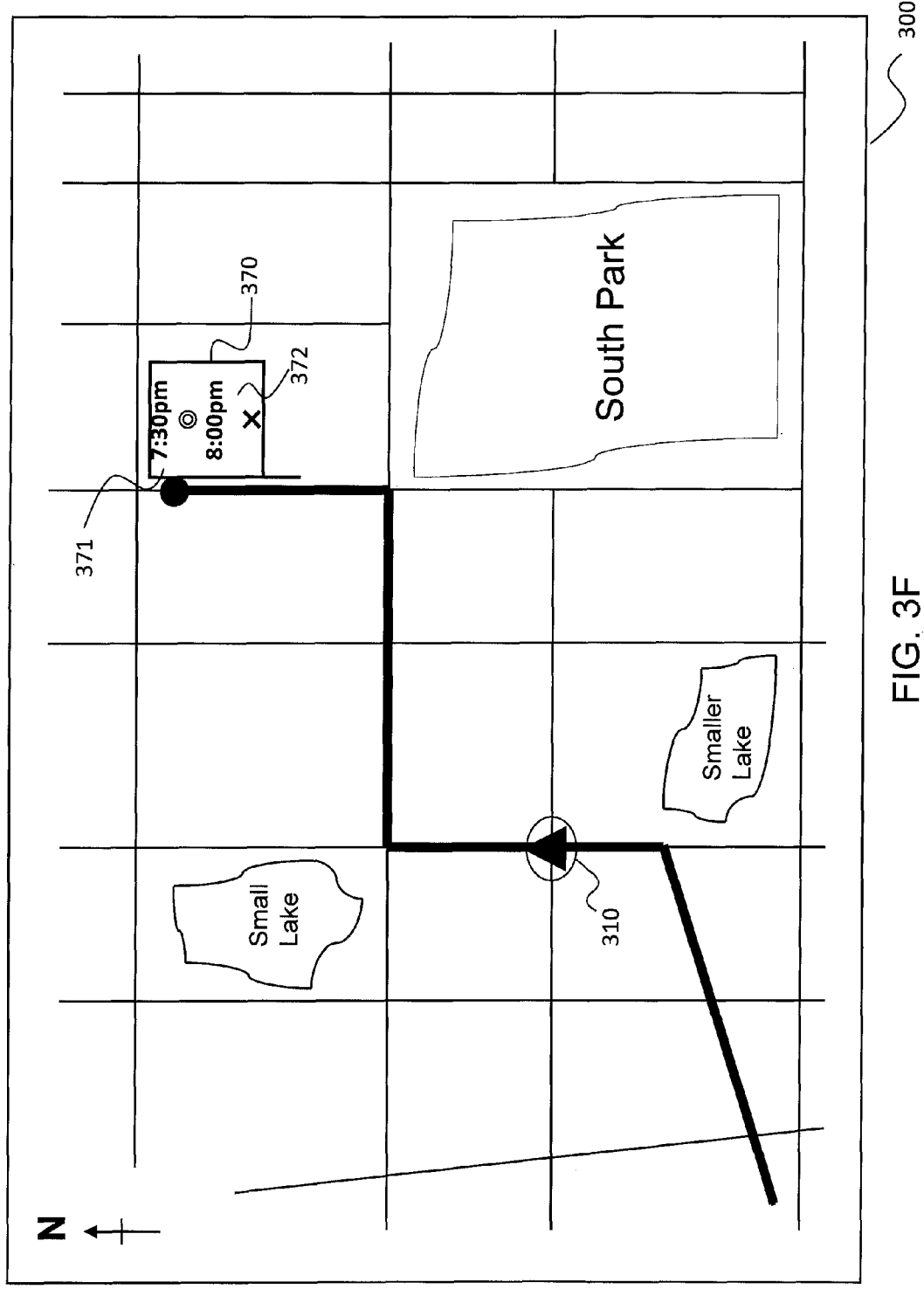

In another embodiment, it is possible to provide availability information which may affect the driver's decision of maneuvers to make in order to reach the point. In FIG. 3E, a navigation map 300 includes an icon 310 indicative of current vehicle position and a point icon 360. The point icon 360 has a shape which graphically indicates a direction corresponding to the estimated side of the street the point is located and additionally includes sub icons 361 and 362 indicating one or more positions of parking lots further indicating remaining capacity by a number of vehicles. In order to display these sub icons 361 and 362, the navigation system obtains the remaining capacity information expressed by a number of vehicles for each parking lot from a parking availability database on the internet. The navigation system may determine positions of the sub icons 361 and 362 in the point icon 320 as earlier described for FIG. 3A and display the point icon 360 and the sub icons 361 and 362 together on the navigation map 300. These sub-icons showing more accurate information of parking availability are helpful for the driver to further determine possible maneuvers to drive to one of the parking lots which has larger capacity without wasting time by trying to park at any other parking lot which may be fully occupied. Alternatively, the availability information may be related to services which may take reservations, such as accommodation, restaurants, beauty related salons, etc. In FIG. 3F, a navigation map 300 includes an icon 310 indicative of current vehicle position and a point icon 370 indicating a place of service, having a shape which graphically indicates a direction corresponding to the estimated side of the street the point is located. The point icon 370 additionally includes a combination of time frame and availability signs 371 and 372 of the point. Any availability information related to the point such as a time frame for each reservation and the degree of availability may be indicated in the point icon 370 in order to assist the driver or passenger to determine whether the point satisfies needs of the driver or passenger in a timely fashion. In order to display these combinations of time frame and availability sign 371 and 372, the navigation system obtains reservation availability for time frames of near future from a service reservation server on the internet, if available. The navigation system may display these combinations of time frame and availability sign 371 and 372 of the point from the one or more network systems in the point icon 370 on the navigation map 300. This type of availability information display method together with the direction of the side of the street can be helpful for the driver to select a point of interest, if a plurality of points of interest is displayed as search candidates on the navigation map 300. These combinations of time frame and availability sign 371 and 372 showing more updated information of the business availability are helpful for the driver to further select a point of interest, if a plurality of points of interest is displayed as search candidates on the navigation map 300.

Figure 3G:
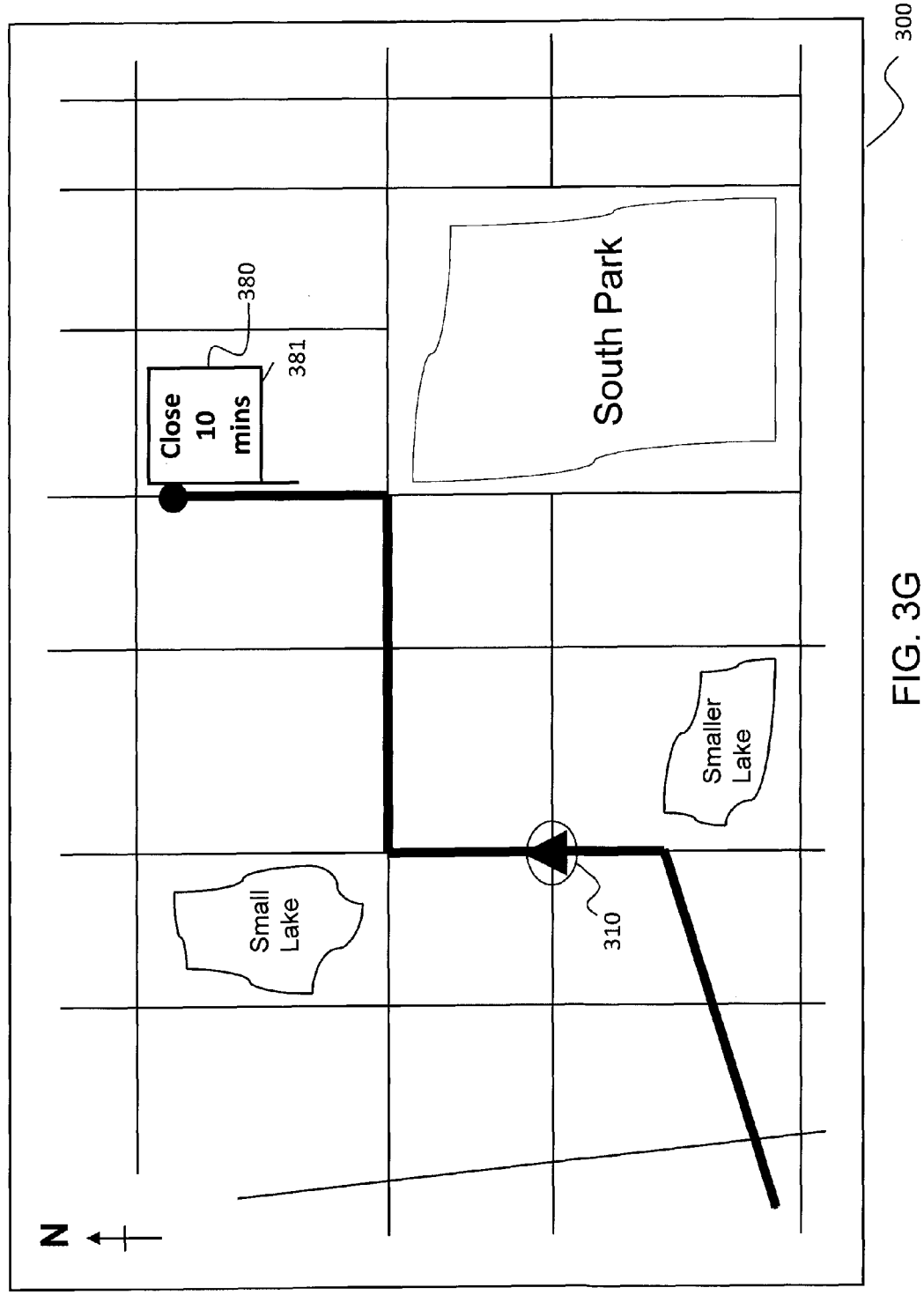

It is possible to display business hour related information in a point icon 380, as illustrated in FIG. 3G. In this example, the information 381 indicates that closing time is approaching. Alternatively, it is also possible to display opening time and closing time in the point icon 380. This type of information may be available from point of interest information database on the internet.

Figure 4A:
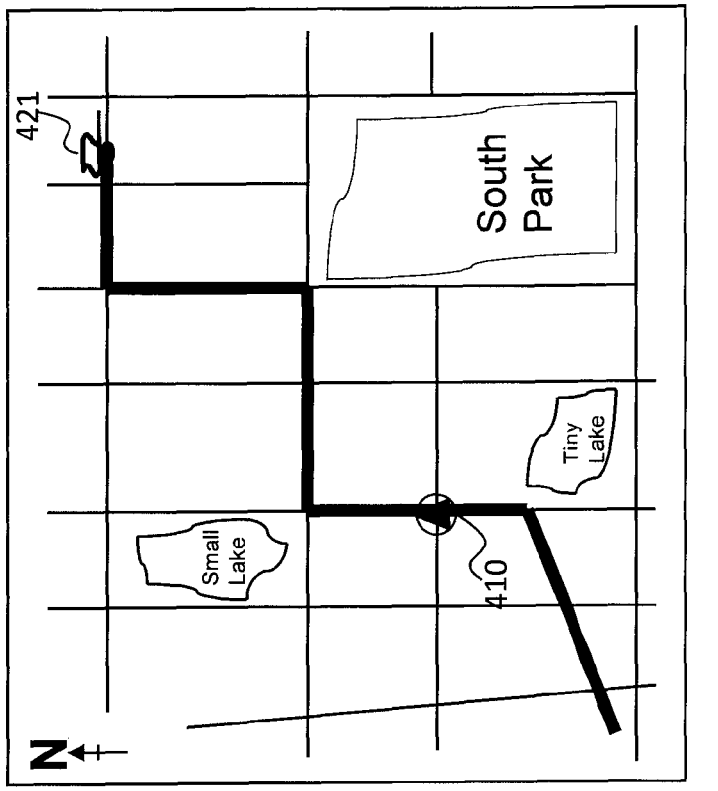
FIGS. 4A and 4B show schematic diagrams illustrating various graphical differentiation scheme based on various embodiments.
Figure 4A:
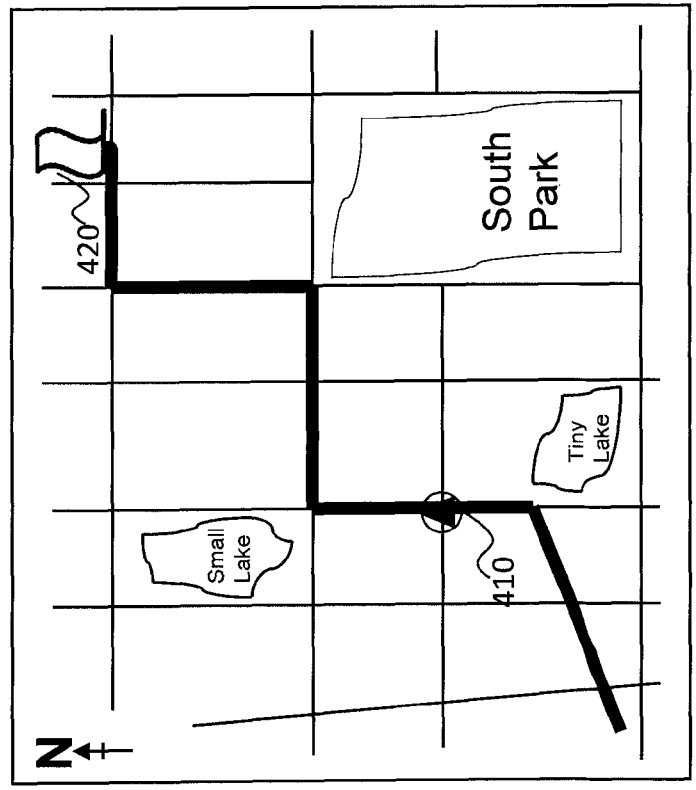

In another embodiment, business status information can be displayed in more abstract and graphical manner. FIG. 4A(a) shows an icon of a current vehicle position 410 and a first point icon 420 having a shape which graphically indicates a direction corresponding to the estimated side of the street the point is located and having a large icon size as if a flag is flying. FIG. 4A(b) shows the icon of the current vehicle position 410 and a second point icon 421 having a shape which graphically indicates a direction corresponding to the estimated side of the street the point is located and having a small icon size as if a flag is being rolled or not flying. Here, it is possible to display the first point icon 420 for indicating the business availability, such as the closing time is not approaching, or the business is not full. On the other hand, in order to display limited availability of the business, such as the closing time is approaching, the capacity is filling up, etc., it is possible to display the second point icon 421 which is graphically distinctive from the first point icon 420 as illustrated in FIG. 4A(b). Additionally, it is possible to display a third point icon (not illustrated) with a flag not flying in order to indicate unavailability of the business, such as the business is being closed or not being available.

Figure 4B:
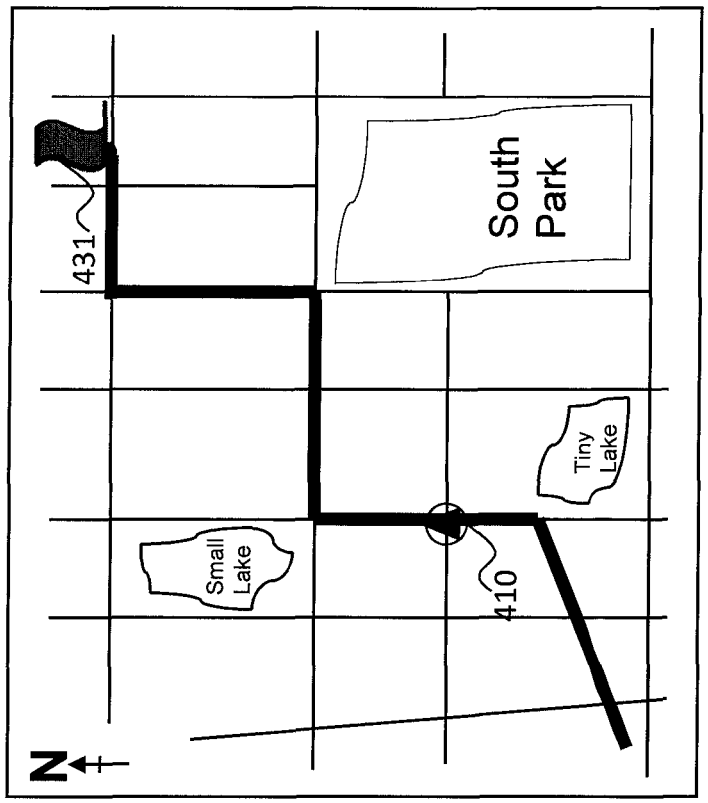
Figure 4B:
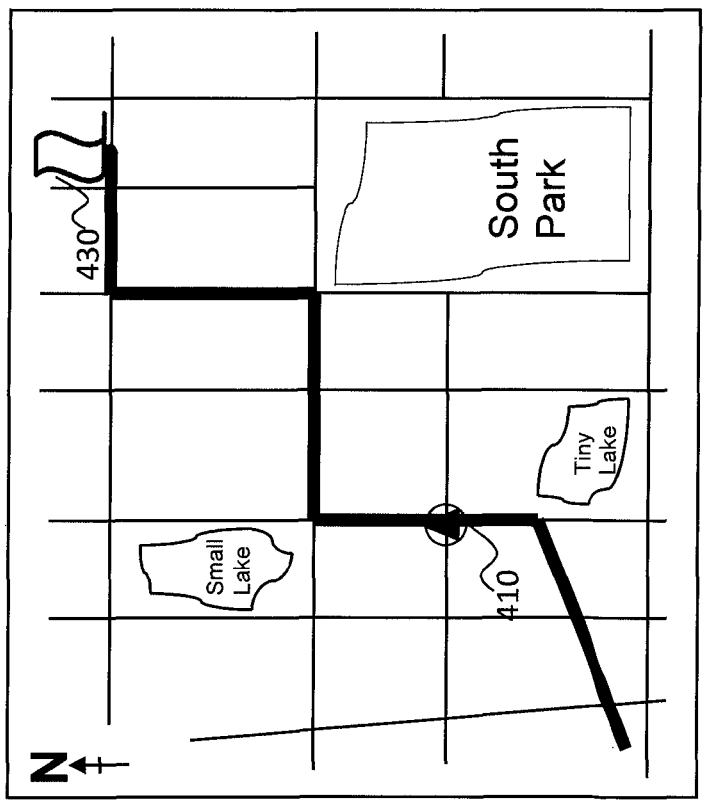

Instead of using size, it is possible to indicate the status of the business by color or pattern of a flag face. FIG. 4B(a) shows an icon of a current vehicle position 410 and a first point icon 430 having a shape which graphically indicates a direction corresponding to the estimated side of the street the point is located and having a bright icon color. FIG. 4B(b) shows the icon of the current vehicle position 410 and a second point icon 431 having a shape which graphically indicates a direction corresponding to the estimated side of the street the point is located and having a darker icon color. Here, it is possible to display the first point icon 430 for indicating the business availability, such as the closing time is not approaching, or the business is not full. On the other hand, in order to display limited availability of the business, such as the closing time is approaching, the capacity is filling up, etc., it is possible to display the second point icon 431 which is graphically distinctive from the first point icon 420 as illustrated in FIG. 4A(b). By using the shape for the direction corresponding to the side of the street the point is located and using the color for the business availability at the point, it is easier for the driver to visually and intuitively obtain a plurality of information requiring less cognitive load for the driver.

Figure 5:
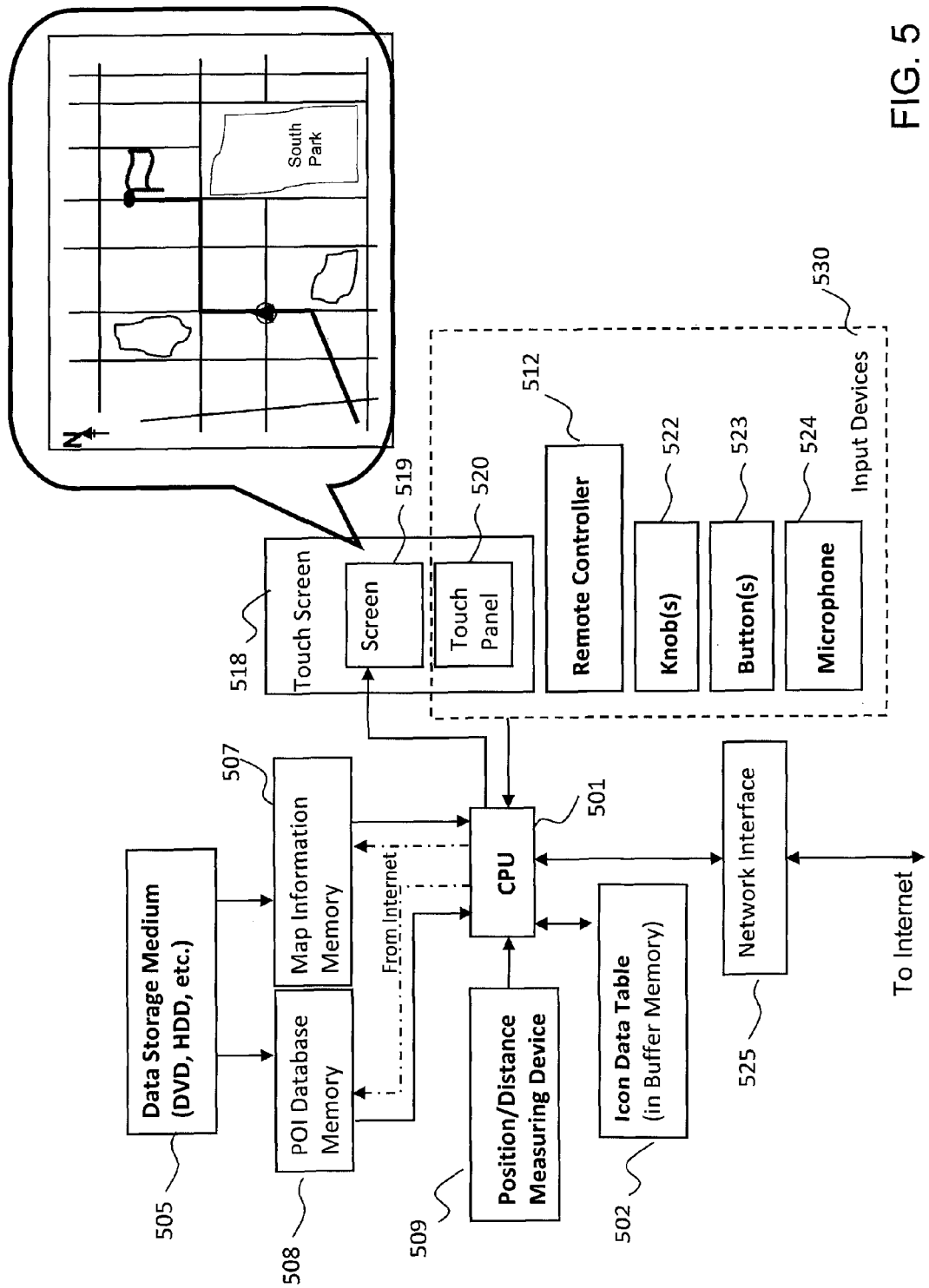
FIG. 5 is a functional block diagram showing an example of basic structure of a navigation system based on one embodiment for displaying a point on a map of a navigation system.

FIG. 5 is a sample functional block diagram showing an example of basic structure of a navigation system based on one embodiment for displaying a plurality of items on a map of a navigation system. Please note that this functional block diagram merely explains functionality and data flow, and actual device controllers or device drivers are not described in this block diagram and a screen does not have to be a touch screen, in fact, any screen which may achieve the similar effect may be applied instead. The structure of FIG. 5 may be applicable to any electronic device having a navigation function which enables the electronic device to guide the user to a particular location as noted above. The apparatus for displaying a plurality of items on a map of a navigation system may include a screen 519 on a touch screen 518 for graphical user interface, and a central processing unit (CPU) 501 for controlling an overall operation of each of the embodiments described above for displaying a point as an icon indicative of a direction corresponding to a side of a street where the point is located on a map of a navigation system.

The block diagram of FIG. 5 further includes a data storage medium 505 such as a DVD or a hard disc for storing map data, a map information memory 507 for storing a required portion of the map data retrieved from data storage medium 505 or from internet via a network interface 525, a point of interest (POI) database memory 508 for storing a required portion of the point of interest (POI) information retrieved from the data storage medium 505 or from internet via the network interface 525, input devices 530 such as a remote controller 512 for the user to select menus, scroll the screen, change the location of the cursor on the screen, etc., as well as a microphone 524 for voice commands, a touch panel 520 for touch input, or a mechanical knob 522 or button(s) 523. A speech recognizer (not shown) may be coupled with the CPU 501 which handles a voice command from the microphone 524. Alternatively, this speech recognition function may be achieved by executing a speech recognition module on the CPU 501. A position measuring device 509 is coupled with the CPU 501 for detecting a current position of the user, and a buffer memory 502 for storing data such as an icon data table for processing the graphical attribute for icon display operation.

As shown in FIG. 5, the CPU 501 is able to retrieve the map data from the data storage medium 505 or from internet via the network interface 525 and the map information memory 507, and point of interest (POI) information from the data storage medium 505 or from internet via the network interface 525 and the POI database memory 508. Based on the retrieved map data, estimating the direction of the side of the street of the point is to be displayed, the CPU 501 selects a shape of the icon indicative of the direction, thus the screen 519 is able to display the icon indicating the direction of the side of the street the point is located. Once the user input is received via manual input devices, such as a knob 522, button(s) 523, a remote controller 512 or a touch panel 520, the user input is processed manually. If a microphone 524 detects a user's voice command associated with an entry of the point, the detected voice command is sent to a speech recognizer, either internal or on the cloud, for recognizing an address, a POI, or an intersection associated with the voice command. Based on the recognized voice command, an item is selected based on the recognized one positional attribute.

Figure 6:
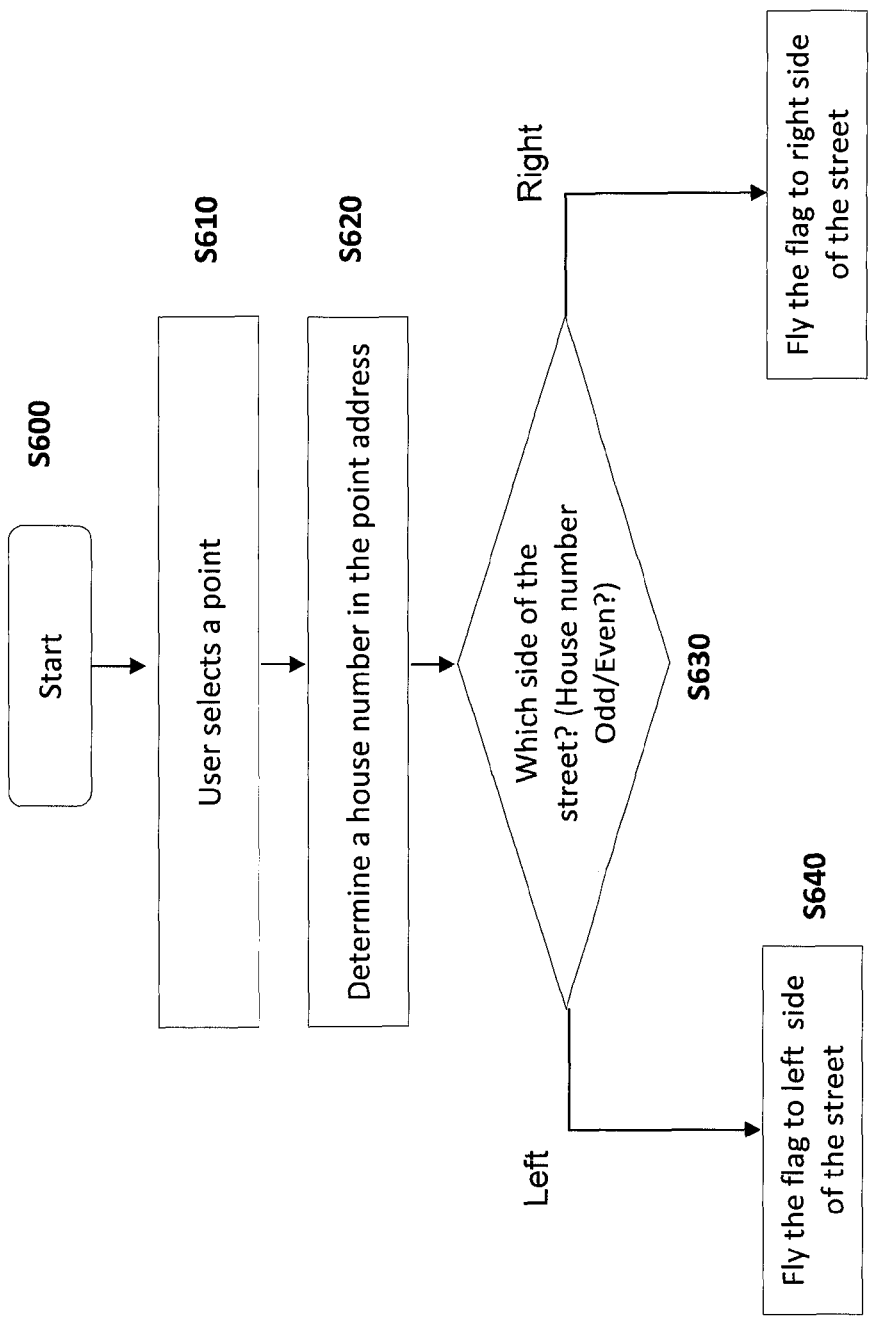
FIG. 6 is a flow chart of determining a side of a street of the point and displaying the point in one embodiment.

FIG. 6 is a flow chart of a procedure of method of displaying the point with additional information on a navigation map of a navigation system installed on a vehicle according to one embodiment. In step S610, a user enters point information on a navigation system, instructing the navigation system to search and identify the point. For example, the entry may be a name of POI, a whole or partial address of the point, street names to identify an intersection near the point, or a category of POIs and area followed by selection of one POI, etc. In step S620, the navigation system determines a house number in the address of the identified point. By knowing the house number and a street name found in the address, it is possible to determine which side of the street the point is located as in step S630, by retrieving map data indicating a road segment which includes the address number of the point and estimate which side of the street the point is located based on the road segment and side information. Usually a point with even house number is located on one side and a point with odd house number is located on the other side, however, actual house number and side combination depends on each district's street plan and accurate information of this combination can be obtained from map database. In step S640, if the side is determined to be on the driver's left, the navigation system displays a flag which flies to a left side of the street on the navigation map. If the side is determined to be on the driver's right, the navigation system displays the flag which flies to a right side of the street on the navigation map instead, as shown in step S650. Thus, the navigation system is able to indicate the side of the street where the point is located more explicitly in a manner that the driver can understand the side at a glance of the flag.

As described earlier, it is possible to display more information related to the point, in addition to the side of the street, in order to provide such information and to assist the driver's understanding of attributes of the point. In one embodiment, FIG. 7 is a flow chart for adding parking entrance information. After a side of a street of the point is obtained and a flag for indicating the side of the street is prepared for displaying, it is possible to obtain parking entrance location data from a map database system, to process the entrance location data suitable for displaying in a directional flag of the point at the step S720 and to display the flag with parking entrance location information in the flag at the step S730.

In another embodiment, FIG. 8 is a flow chart for adding floor information of the point which is a POI. After a side of a street of the point is obtained and a flag for indicating the side of the street is prepared for displaying, it is possible to obtain floor data from a POI information database, to process the floor data suitable for displaying in a directional flag of the point at the step S820, and to display the flag with floor information in the flag at the step S830.

In another embodiment, FIG. 9 is a flow chart for adding parking availability information of the point. After a side of a street of the point is obtained and a flag for indicating the side of the street is prepared for displaying, it is possible to obtain parking availability data indicating a number of remaining spots available among the parking facility's capacity from a parking availability database, to process the parking availability data suitable for displaying in a directional flag of the point at the step S920 and to display the flag with parking availability information in the flag at the step S930. Similarly, in another embodiment, FIG. 10 is a flow chart of adding restaurant capacity information of the point. It is possible to obtain restaurant capacity data indicating a number of remaining spots from a restaurant reservation database and application server, to process the restaurant capacity data suitable for displaying in a directional flag of the point at the step S1020 and to display the flag with restaurant capacity information in the flag at the step S1030.

By obtaining additional information and presenting the additional information together with the directional flag or icon in a visually distinctive manner, it is possible for the driver to obtain several point information for assisting the driver to reach the point while minimizing potential risks of driver distraction.

In another embodiment, the method may be applied to a navigation system including a server and a client (not shown), where actual displaying and voice detection are executed at the client and the map processing can be executed at a server. In another embodiment, the navigation system may be implemented as a mobile apparatus, such as a smartphone and its application (not shown). Alternatively, in another embodiment, the system displaying one or more points with traffic conditions on a map may simply be installed on a standalone static machine.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. A method of displaying a point on a map of route guidance, the method comprising the following steps of:
   receiving an entry of a user;
   determining a point based on the entry of the user;
   determining an address number of the point;
   retrieving map data indicating a road segment which includes the address number of the point from map information storage;
   estimating a position of the location based on the street address number of the point and position data of the road segment;
   automatically estimating, by a processor, a side of the street at which the point is located;
   automatically selecting a shape of an icon by the processor based on the estimated side of the street; and
   automatically displaying the point with the icon at the estimated position on the map, and
   wherein the shape of the icon is configured to graphically indicate a direction corresponding to the side of the street at the estimated position.

2. The method of claim 1, further comprising the following steps of:
   obtaining building area map information of the point from the map information storage;
   estimating one or more positions of one or more entrances to the area of the building from the building area map information of the point; and
   displaying one or more sub icons representing the one or more entrances indicative of the estimated one or more positions in the icon.

3. The method of claim 1, further comprising the following steps of:
   receiving at least one of building and floor information of the point from a point of interest information database; and
   displaying at least one of building and floor information of the point in the icon.

4. The method of claim 1, further comprising the following steps of:
   obtaining one or more street views of the point from the map information storage, if available; and
   displaying the one or more street views of the point in the icon.

5. The method of claim 1, further comprising the following steps of:
   obtaining one or more ratings of the point from one or more network systems, if available; and
   displaying the one or more ratings of the point on the one or more network systems in the icon.

6. The method of claim 1, further comprising the following steps of:
   obtaining one or more statuses of availability of one or more facilities at the point via internet; and
   displaying the one or more statuses of availability in the icon.

7. The method of claim 6,
   wherein displaying the one or more statuses of availability in the icon further comprises graphically changing a whole or portion of the icon by one of a size, a shape and a color.

8. The method of claim 6,
   wherein one of the one or more facilities is a parking facility and the status of availability of the parking facility is indicative of remaining capacity by a number of vehicles obtained from a parking availability database on the internet.

9. The method of claim 6,
wherein the one or more facilities are businesses and the one or more statuses of availability of the businesses are indicative of reservation availability for time frames of near future obtained from a service reservation server on the internet.

10. The method of claim 6,
wherein the one or more facilities are businesses and the one or more statuses of availability are indicative of business hour statuses of the businesses in near future, obtained from a point of interest information database on the internet.

11. A navigation system comprising:
one or more input device configured to receive an entry of a user;
a processor configured to determine the point based on the entry of the user, to determine an address number of the point, to retrieve map data indicating a road segment which includes the address number of the point, to automatically estimate a position of the location based on the street address number of the point and position data of the road segment, to automatically estimate a side of the street at which the point is located, to automatically select a shape of an icon by the processor based on the estimated side of the street; and
a screen configured to display the point with the icon at the estimated position on a map of route guidance;
wherein the shape of the icon is configured to graphically indicate a direction corresponding to the side of the street at the estimated position.

12. The navigation system of claim 11,
wherein the processor is further configured to obtain building area map information of the point from the map information storage, estimate one or more positions of one or more entrances to the area of the building from the building area map information of the point, and
wherein the screen is further configured to display one or more sub icons representing the one or more entrances indicative of the estimated one or more positions in the icon.

13. The navigation system of claim 11,
wherein the processor is further configured to receive at least one of building and floor information of the point from a point of interest information database, and
wherein the screen is further configured to display at least one of building and floor information of the point in the icon.

14. The navigation system of claim 11,
wherein the processor is further configured to obtain one or more street views of the point from the map information storage, if available, and
wherein the screen is further configured to display the one or more street views of the point in the icon.

15. The navigation system of claim 11,
wherein the processor is further configured to obtain one or more ratings of the point from one or more network systems, if available, and
wherein the screen is further configured to display the one or more ratings of the point on the one or more network systems in the icon.

16. The navigation system of claim 11,
wherein the processor is further configured to obtain one or more statuses of availability of one or more facilities at the point via internet; and
wherein the screen is further configured to display the one or more statuses of availability in the icon.

17. The navigation system of claim 16,
wherein the screen is further configured to display the one or more statuses of availability in the icon further by graphically changing a whole or portion of the icon by one of a size, a shape and a color.

18. The navigation system of claim 16,
wherein one of the one or more facilities is a parking facility and the status of availability of the parking facility is indicative of remaining capacity by a number of vehicles obtained from a parking availability database on the internet.

19. The navigation system of claim 16,
wherein the one or more facilities are businesses and the one or more statuses of availability of the businesses are indicative of reservation availability for time frames of near future obtained from a service reservation server on the internet.

20. The navigation system of claim 16,
wherein the one or more facilities are businesses and the one or more statuses of availability are indicative of business hour statuses of the businesses in near future, obtained from a point of interest information database on the internet.

* * * * *